United States Patent
Iwaki

(10) Patent No.: US 9,746,047 B2
(45) Date of Patent: Aug. 29, 2017

(54) SOUND REDUCTION OR VIBRATION DAMPING APPARATUS AND STRUCTURAL MEMBER

(71) Applicant: THK CO., LTD., Tokyo (JP)

(72) Inventor: Junichiro Iwaki, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/897,798

(22) PCT Filed: Jun. 18, 2014

(86) PCT No.: PCT/JP2014/066098
§ 371 (c)(1),
(2) Date: Dec. 11, 2015

(87) PCT Pub. No.: WO2014/203916
PCT Pub. Date: Dec. 24, 2014

(65) Prior Publication Data
US 2016/0123423 A1    May 5, 2016

(30) Foreign Application Priority Data

Jun. 19, 2013  (JP) ................................. 2013-128518

(51) Int. Cl.
*F16F 7/104* (2006.01)
*F16F 15/03* (2006.01)
(Continued)

(52) U.S. Cl.
CPC ............ *F16F 7/104* (2013.01); *F16F 7/1011* (2013.01); *F16F 15/005* (2013.01);
(Continued)

(58) Field of Classification Search
CPC ........ F16F 15/005; F16F 15/007; F16F 15/02; F16F 15/03; F16F 7/104; F16F 7/1011;
(Continued)

(56) References Cited

U.S. PATENT DOCUMENTS

| | | | | |
|---|---|---|---|---|
| 4,935,838 A | * | 6/1990 | Barger | .................... F16F 15/02 318/114 |
| 5,421,655 A | * | 6/1995 | Ide | ........................ F01D 25/164 384/99 |

(Continued)

FOREIGN PATENT DOCUMENTS

| | | |
|---|---|---|
| CN | 103079849 | 5/2013 |
| JP | 05-187152 | 7/1993 |

(Continued)

OTHER PUBLICATIONS

Chinese Office Action dated Jul. 5, 2016 in corresponding Chinese Patent Application No. 201480033489.0 with English translation of Chinese Office Action cover page.

(Continued)

*Primary Examiner* — Thomas J Williams
(74) *Attorney, Agent, or Firm* — Young & Thompson

(57) ABSTRACT

Provided is a sound reduction or vibration damping apparatus that has a new sound control principle where the sound control principle is totally different from a known passive or active sound control apparatus. A sound reduction or vibration damping apparatus 1 includes a mass portion 11, spring portions 12a and 12b placed between the mass portion 11 and a structural member 13, and a control unit 4 for causing the spring constants of the spring portions 12a and 12b to continue changing. The sound reduction or vibration damping apparatus 1 is mounted on the structural member 13 to reduce sound passing through the structural member 13 or sound generated from the structural member, or damp the vibration of the structural member 13.

19 Claims, 13 Drawing Sheets

(51) Int. Cl.
*G10K 11/175* (2006.01)
*F16F 7/10* (2006.01)
*F16F 15/02* (2006.01)
*F16F 15/00* (2006.01)

(52) U.S. Cl.
CPC .......... *F16F 15/007* (2013.01); *F16F 15/02* (2013.01); *F16F 15/03* (2013.01); *F16F 15/035* (2013.01); *G10K 11/175* (2013.01); *F16F 2222/06* (2013.01); *F16F 2224/0283* (2013.01); *G10K 2210/1291* (2013.01)

(58) Field of Classification Search
CPC ............... F16F 15/035; F16F 2222/06; F16F 2224/0283; G10K 11/175; G10K 2210/1291
See application file for complete search history.

(56) References Cited

U.S. PATENT DOCUMENTS

| | | | | |
|---|---|---|---|---|
| 6,327,024 B1 * | 12/2001 | Hayashi | ................. | F16F 15/02 188/267 |
| 6,464,213 B1 * | 10/2002 | Kojima | ................. | F16F 13/00 188/267 |
| 2010/0109219 A1 * | 5/2010 | Melz | ................. | F16F 15/007 267/140.15 |
| 2013/0166149 A1 | 6/2013 | Liu et al. | | |

FOREIGN PATENT DOCUMENTS

| | | |
|---|---|---|
| JP | 2002-070933 | 3/2002 |
| JP | 2003-184945 | 7/2003 |
| JP | 2004-270399 | 9/2004 |
| JP | 2009-138893 | 6/2009 |
| TW | M401844 | 4/2011 |
| WO | WO 2012/033131 | 3/2012 |

OTHER PUBLICATIONS

International Search Report, PCT/JP2014/066098, Jul. 29, 2014.
Taiwanese Office Action dated May 19, 2017 in corresponding Taiwanese Patent Application No. 103121170.

\* cited by examiner

*FIG. 4*

| | COIL ENERGIZATION MODEL | SPRING MODEL |
|---|---|---|
| 1. NOT-ENERGIZED (S1) | 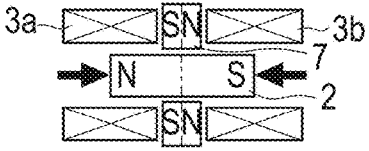 |  CONSTANT 1.0K   CONSTANT 1.0K |
| 2. ENERGIZED IN CW DIRECTION (S2) | 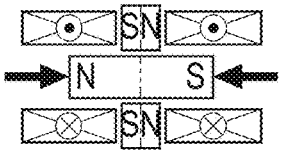 | 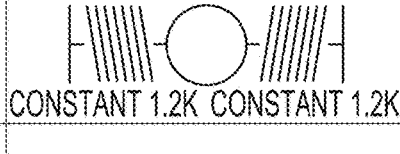 CONSTANT 1.2K   CONSTANT 1.2K |
| 3. ENERGIZED IN CW DIRECTION (S3) | 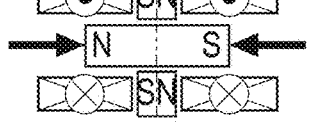 |  CONSTANT 1.4K   CONSTANT 1.4K |
| 4. ENERGIZED IN CW DIRECTION (S4) | 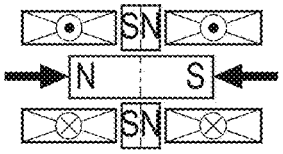 |  CONSTANT 1.2K   CONSTANT 1.2K |
| 5. NOT-ENERGIZED (S5) | 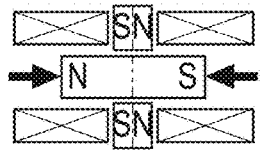 |  CONSTANT 1.0K   CONSTANT 1.0K |
| 6. ENERGIZED IN CCW DIRECTION (S6) | 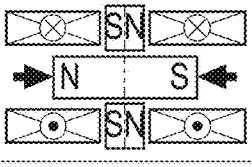 |  CONSTANT 0.8K   CONSTANT 0.8K |
| 7. ENERGIZED IN CCW DIRECTION (S7) | 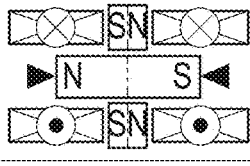 | 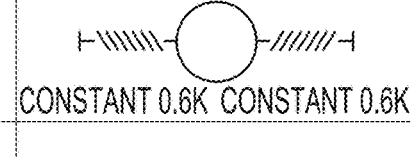 CONSTANT 0.6K   CONSTANT 0.6K |
| 8. ENERGIZED IN CCW DIRECTION (S8) | 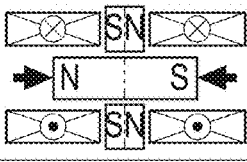 |  CONSTANT 0.8K   CONSTANT 0.8K |
| 1. NOT-ENERGIZED (S1) | 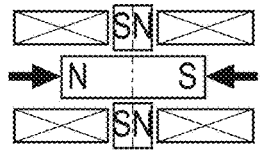 |  CONSTANT 1.0K   CONSTANT 1.0K |

SOUND REDUCTION OR VIBRATION DAMPING APPARATUS AND STRUCTURAL MEMBER

TECHNICAL FIELD

The present invention relates to a sound reduction or vibration damping apparatus that is attached to a structural member to reduce sound passing through the structural member or sound generated from the structural member, or damp the vibration of the structural member.

BACKGROUND ART

A soundproof wall that reduces sound passing through a structural member has conventionally been known. Soundproof walls are installed at roads, railroads, or factories to prevent noise generated from noise sources such as automobiles from leaking to the surroundings. In addition, a sound or vibration reduction apparatus is also known which reduces sound generated from structural members of various devices such as air-conditioners, printers, and copiers, or the vibration of the structural members.

Passive sound control that reduces sound with each portion of a structural member without the need of the input of energy such as electric power is used for a typical soundproof wall, or sound or vibration reduction apparatus. A gypsum board that reflects sound, glass wool that absorbs sound, and the like are incorporated in, for example, a structural member of the soundproof wall to reduce sound with each portion of the structural member.

In recent years, active sound control that reduces noise actively with the input of energy such as electric power has been proposed to further reduce sound (see Patent Literature 1). The active sound control includes a microphone, a speaker, and an electronic circuit that generates cancelling sound from the speaker. The principle of noise cancelling is to generate, from the speaker, a sound wave component of an opposite phase to noise picked up by the microphone, cancel out each other, and reduce the noise.

CITATION LIST

Patent Literature

Patent Literature 1: JP 2004-270399 A

SUMMARY OF INVENTION

Technical Problem

However, the known active sound control has a problem that it is not possible to avoid the occurrence of a temporal delay from when the microphone picks up noise to when the speaker goes into action and accordingly it is difficult to completely cancel out noise. Moreover, there are other problems that an electronic circuit that performs complicated signal processing is required, and that if sound has multiple frequency components, it is difficult for the electronic circuit to generate a signal of an opposite phase.

Passive sound control and active sound control continue being developed. However, any of them has a limit in theory to control sound. Hence, an object of the present invention is to provide a new sound reduction or vibration damping apparatus and structural member, which have a different principle from the known passive or active sound control.

Solution to Problem

One aspect of the present invention is a sound reduction or vibration damping apparatus including: a mass portion; a spring portion placed between the mass portion and a structural member; and a control unit for causing a spring constant of the spring portion to continue changing.

Advantageous Effects of Invention

According to the present invention, the spring constant of a sound reduction or vibration damping apparatus is caused to continue changing. Accordingly, the natural frequency of the sound reduction or vibration damping apparatus continues changing. When the sound reduction or vibration damping apparatus whose natural frequency continues changing is mounted on a structural member, the resonant frequency of the structural member fluctuates from a fixed value. Resonance occurs in the structural member at the resonant frequency and accordingly, easily transmits sounds near the resonant frequency. However, the resonant frequency of the structural member is fluctuated from the fixed value by mounting the sound reduction or vibration damping apparatus thereon. Accordingly, the frequency of a sound matches the resonant frequency of the structural member at a certain instant, which facilitates the sound to pass through the structural member. However, the frequency of the sound is different from the resonant frequency of the structural member at the next instant. Hence, it is difficult for the sound to pass through the structural member. Therefore, it becomes possible to reduce sounds near the resonant frequency that pass the structural member.

Sound is a vibration that propagates through the air. The sound reduction or vibration damping apparatus of the present invention can be used not only to reduce the sound of the structural member but also to damp the vibration of the structural member itself.

In the present invention, "the spring constant of a spring portion is caused to continue changing" indicates that even if there is a time when the natural frequency of the sound reduction or vibration damping apparatus becomes equal to the frequency of the structural member, the natural frequency of the sound reduction or vibration damping apparatus is changed (that is, shifted) from the frequency of the structural member immediately afterward. In a known dynamic damper (a vibration damping apparatus that prevents the resonance of a structural member by adding a mass portion via a spring portion to the structural member that attempts to damp vibration), the spring constant of the spring portion is set in such a manner as to make the natural frequency of the damping apparatus equal to the frequency of the structural member. The mass portion takes over the vibration of the structural member to vibrate. The present invention is different from the known dynamic damper in the point that "the spring constant of the spring portion is caused to continue changing."

BRIEF DESCRIPTION OF DRAWINGS

FIG. 4 is a schematic diagram illustrating the relationship between cyclic changes in current supplied to a first and a second coil and cyclic changes in spring constant.

DESCRIPTION OF EMBODIMENTS

Figure 1:
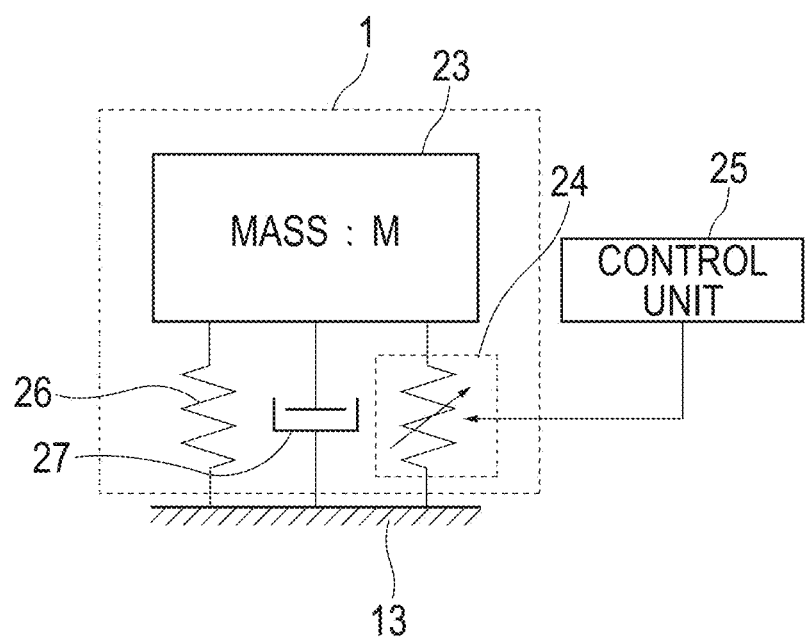
FIG. 1 is a model diagram of a sound reduction or vibration damping apparatus of the present invention.

Based on the accompanying drawings, a sound reduction or vibration damping apparatus according to one embodiment of the present invention is described in detail below. FIG. 1 illustrates a model diagram of the sound reduction or vibration damping apparatus of the present invention. A sound reduction or vibration damping apparatus 1 is mounted on a structural member 13 that attempts to reduce sound or damp vibration to reduce the sound of the structural member 13 or damp the vibration of the structural member 13.

The sound reduction or vibration damping apparatus 1 includes a mass portion 23 of a predetermined mass M elastically supported by the structural member 13. The feature of the present invention lies in that a spring portion 24 with a variable spring constant is placed between the mass portion 23 and the structural member 13 and a control unit 25 continues changing the spring constant of the spring portion 24. A spring portion 26 with a fixed spring constant and a damper portion 27 with a fixed damping coefficient are further placed between the structural member 13 and the mass portion 23. The spring portion 26 and the damper portion 27 are general elastic supports.

A natural frequency ω of the sound reduction or vibration damping apparatus 1 is expressed as $\omega = \sqrt{(K+k)/m}$ where K is the spring constant of the spring portion 26, and k is the spring constant of the spring portion 24. If the spring constant k of the spring portion 24 is caused to continue changing, the natural frequency of the sound reduction or vibration damping apparatus 1 continues changing.

Examples of the spring portion 24 include one using coils (see the following first and second embodiments of the present invention), and one using magnetostrictive elements or piezoelectric elements (see the following third to fifth embodiments of the present invention). The spring portion 24 preferably includes a first and a second spring portion (see reference numerals 12a and 12b of FIG. 3 and reference numerals 42a and 42b of FIG. 8) that push and/or pull the mass portion 23 simultaneously in opposite directions to prevent the displacement of the mass portion 23. When the first and second spring portions push the mass portion 23 simultaneously in the opposite directions with large force, the stiffness of the sound reduction or vibration damping apparatus 1 is increased. Accordingly, the spring constant of the spring portion 24 is increased. On the other hand, when the first and second spring portions push the mass portion 23 simultaneously in the opposite directions with small force, the stiffness of the sound reduction or vibration damping apparatus 1 is reduced. Accordingly, the spring constant of the spring portion 24 is reduced.

The control unit 25 controls the spring portion 24 in such a manner as to cause the spring constant of the spring portion 24 to continue changing. The control unit 25 includes a driver that supplies electric power to a coil, magnetostrictive element, or piezoelectric element, and a controller that transmits a command to the driver.

Figure 2:
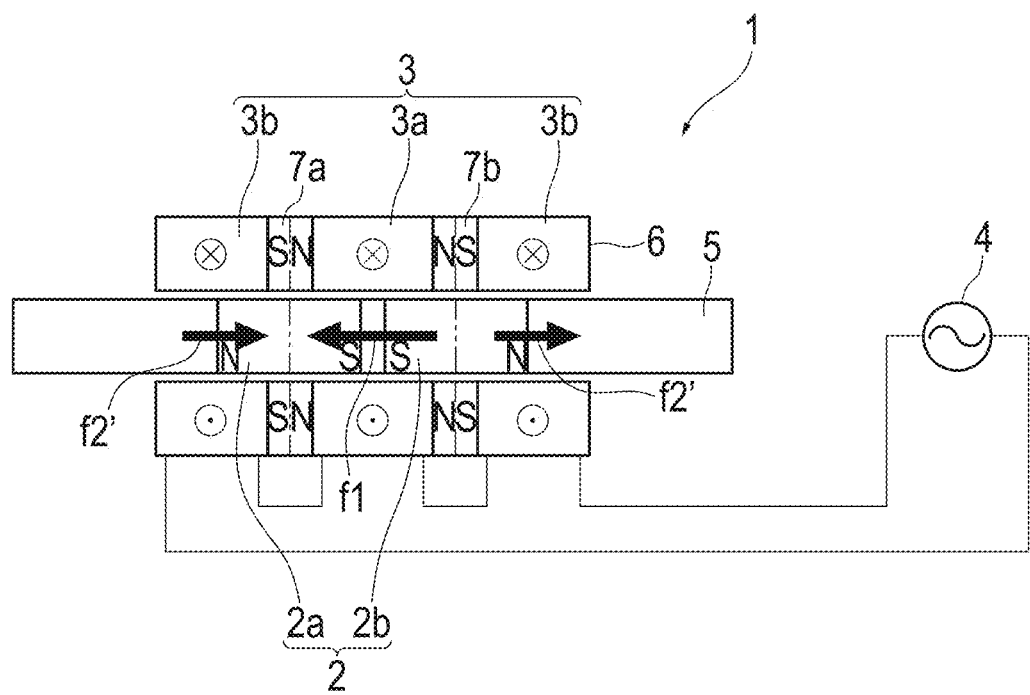
FIG. 2 is a schematic diagram of a sound reduction or vibration damping apparatus of a first embodiment of the present invention.

FIG. 2 illustrates a schematic diagram of the sound reduction or vibration damping apparatus of a first embodiment of the present invention using coils. The sound reduction or vibration damping apparatus 1 of the embodiment includes an output shaft 5 having a magnet 2 magnetized in the direction of its axis, an armature portion 6 having first and second coils 3a and 3b that exert force including an attractive force and a repulsive force on the magnet 2, a control unit 4 that supplies electric power to the first and second coils 3a and 3b, and first and second holding magnets 7a and 7b as magnets for restoration that restore the output shaft 5 to the position of its origin point. One of the output shaft 5 and the armature portion 6 is fixed to the structural member 13.

The correspondence between the sound reduction or vibration damping apparatus 1 of FIG. 2 and the model of FIG. 1 is as follows: When the output shaft 5 is fixed to the structural member 13, the armature portion 6 of FIG. 2 corresponds to the mass portion 23 of FIG. 1. When the armature portion 6 is fixed to the structural member 13, the output shaft 5 of FIG. 2 corresponds to the mass portion 23 of FIG. 1. A magnetic spring including the magnet 2, the first and second coils 3a and 3b, and the first and second holding magnets 7a and 7b of FIG. 2 corresponds to the spring portion 24 with the variable spring constant of FIG. 1. The friction caused when the armature portion 6 moves relatively to the output shaft 5 of FIG. 2 corresponds to the damping force of the damper portion 27 of FIG. 1. In the sound reduction or vibration damping apparatus 1 of FIG. 2, the spring portion 26 with the fixed spring constant of FIG. 1 does not exist, but a coil spring and the like can be additionally provided.

The magnet 2 includes a cylindrical first magnet 2a and a cylindrical second magnet 2b. The first and second magnets 2a and 2b are arranged in the output shaft 5 such that the same poles face each other (the south poles in the example of FIG. 1). The first magnet 2a is equal in size and strength to the second magnet 2b. For example, the south pole is formed at the center in the direction of the axis of the magnet 2 including the first and second magnets 2a and 2b. For example, the north poles are formed at both ends of the direction of the axis of the magnet 2. The magnetic field lines are radially formed from the south and north poles. The magnetic flux of the south pole is double that of the north pole. The output shaft 5 is surrounded with the tubular armature portion 6. The output shaft 5 is supported by the armature portion 6 via a bearing such as a bush in such a manner as to be linearly movable in the direction of the axis.

The first and second coils 3*a* and 3*b* are arranged in the armature portion 6 with their axis directions aligned. The first coil 3*a* includes one coil. The second coils 3*b* include two coils provided at both ends in the direction of the axis of the first coil 3*a*. The coils are equal in number of windings, wire diameter, and size to each other. The center in the direction of the axis of the central first coil 3*a* agrees with the position of the center in the direction of the axis of the magnet 2 including the first and second magnets 2*a* and 2*b* (the position of the south pole). The center in the direction of the axis of the left second coil 3*b* agrees with the left end position of the first magnet 2*a* (the position of the north pole). The center in the direction of the axis of the right second coil 3*b* agrees with the right end position of the second magnet 2*b* (the position of the north pole).

When currents of the same magnitude are caused to flow through the first and second coils 3*a* and 3*b*, the first and second coils 3*a* and 3*b* apply repulsive and attractive forces f1 and f2 to the magnet 2. The force f1 applied to the magnet 2 by the first coil 3*a* is the same in magnitude as and opposite in direction to the force f2 applied to the magnet 2 by the second coils 3*b* (a total of a force f2' applied to the first magnet 2*a* by the left second coil 3*b* and a force f2' applied to the second magnet 2*b* by the right second coil 3*b*). When alternating current is caused to flow through the first and second coils 3*a* and 3*b*, the force f1 applied to the magnet 2 by the first coil 3*a* and the force f2 applied to the magnet 2 by the second coils 3*b* change cyclically. The force f1 is the same in magnitude as and opposite in direction to the force f2. Hence, even if the force f1 and the force f2 change cyclically, the output shaft 5 is not displaced from the origin point.

The armature portion 6 is provided with the ring-shaped first and second holding magnets 7*a* and 7*b* that hold the output shaft 5 at the origin point. The first holding magnet 7*a* is placed at the center in the direction of the axis of the first magnet 2*a*. The second holding magnet 7*b* is placed at the center in the direction of the axis of the second magnet 2*b*. The interaction between the magnetic forces of the first and second holding magnets 7*a* and 7*b* and the magnetic forces of the first and second magnets 2*a* and 2*b* causes the output shaft 5 to be held at the origin point.

In the above embodiment, the first and second coils 3*a* and 3*b* include three coils in total. The magnet 2 includes two magnets, the first and second magnets 2*a* and 2*b*, in total. However, as long as it is possible to apply, to the output shaft 5, forces that push and/or pull from both sides, the number of the coils 3 is not limited to three, and may be two or four. The number of the magnets 2 is not limited to two, either, and may be one or three.

The control unit 4 includes, for example, an acoustic amplifier as the driver, and a sine wave input apparatus as the controller that inputs alternating current to the acoustic amplifier. The vibration of the structural member 13 on which the sound reduction or vibration damping apparatus 1 is mounted is not measured. The control unit 4 supplies alternating current to the first and second coils 3*a* and 3*b* based not on the vibration of the structural member 13 (in other words, irrespective of the vibration of the structural member 13). However, for the purpose of reducing the amount of power consumption, it is also possible to measure the vibration of the structural member 13, and to stop the supply of electric current to the first and second coils 3*a* and 3*b* if the amplitude is equal to or less than a fixed level.

The first and second coils 3*a* and 3*b* are connected in series or parallel with the control unit 4. In this embodiment, the control unit 4 supplies alternating current of the same phase of a fixed cycle (for example, 100 Hz, 200 Hz, and 300 Hz) to the first and second coils 3*a* and 3*b*. The alternating current can be any of a sine wave, triangle wave, trapezoidal wave, and square wave. The control unit 4 supplies the alternating current of the fixed cycle to the first and second coils 3*a* and 3*b*. However, it is also possible to provide the control unit 4 with the function of changing the cycle of the alternating current, for example, the function of changing the cycle of the alternating current in, for example, the order of 100 Hz, 200 Hz, and 100 Hz with the passage of time. It is also possible to measure the vibration of the structural member 13 and change the cycle of the alternating current based on the vibration of the structural member 13. Moreover, the control unit 4 can also supply, to the first and second coils 3*a* and 3*b*, electric current including a wave obtained by combining a plurality of sine waves having different cycles. The control unit 4 can also supply electric current that changes randomly. The control unit 4 can also supply electric current where the relationship between frequency and amplitude is the relationship of 1/f fluctuation.

When the alternating current is supplied to the first and second coils 3*a* and 3*b*, the forces applied to the magnet 2 by the first and second coils 3*a* and 3*b* change cyclically. The force f1 applied to the magnet 2 by the first coil 3*a* is the same in magnitude as and opposite in direction to the force f2 applied to the magnet 2 by the second coils 3*b*. Accordingly, the forces that push and/or pull from both sides act on the output shaft 5. The output shaft 5 is supported by the armature portion 6 in such a manner as to be movable in the direction of the axis. However, the same forces act on the output shaft 5 from both sides as described above. Hence, the output shaft 5 dose not vibrate substantially from the origin point. It is very difficult to cause the forces on both sides of the output shaft 5 to match each other. The balance of the forces may be slightly lost and the output shaft 5 may vibrate minutely. Including such a case, it can be said that the output shaft 5 dose not vibrate substantially from the origin point.

Figure 3:
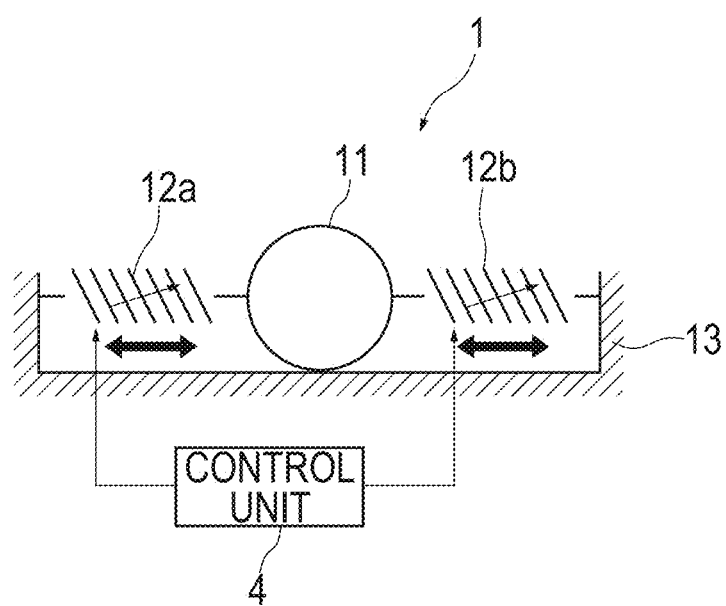
FIG. 3 is a diagram illustrating an equivalent model of the sound reduction or vibration damping apparatus of the first embodiment of the present invention.

FIG. 3 illustrates an equivalent model of the sound reduction or vibration damping apparatus 1 of the embodiment. The forces that push and/or pull from both sides act on the output shaft 5. Accordingly, the sound reduction or vibration damping apparatus 1 of the embodiment can be presented in an equivalent model where the mass portion 11 is sandwiched between the first and second spring portions 12*a* and 12*b*. The first and second spring portions 12*a* and 12*b* are placed between the mass portion 11 and the structural member 13. When the output shaft 5 is fixed to the structural member 13, the armature portion 6 corresponds to the mass portion 11. When the armature portion 6 is fixed to the structural member 13, the output shaft 5 corresponds to the mass portion 11. The first and second coils 3*a* and 3*b*, the magnet 2, and the first and second holding magnets 7*a* and 7*b* constitute a magnetic spring that generates a repulsive force and an attractive force and accordingly, correspond to the first and second spring portions 12*a* and 12*b*. The first coil 3*a*, the magnet 2, and the first and second holding magnets 7*a* and 7*b* correspond to the first spring portion 12*a*. The second coil 3*b*, the magnet 2, and the first and second holding magnets 7*a* and 7*b* correspond to the second spring portion 12*b*. When the control unit 4 causes the alternating current to flow through the first and second coils 3*a* and 3*b*, the repulsive force and the attractive force caused by the first and second coils 3*a* and 3*b* change cyclically.

The first and second spring portions 12*a* and 12*b* push and/or pull the mass portion 11 from both sides with the same force without displacing the mass portion 11 from the origin point. The forces that push and/or pull the mass portion 11 change cyclically. Accordingly, the spring constants of the first and second spring portions 12a and 12b change cyclically without the displacement of the mass portion 11.

FIG. 4 is a schematic diagram illustrating the relationship between cyclic changes in current supplied to the first and second coils 3a and 3b and cyclic changes in spring constant. In the schematic diagram, for the purpose of making it easier to understand, two coils 3a and 3b and one magnet 2 are used, and the holding magnet 7 is provided between the two coils 3a and 3b. Also when the three coils 3b, 3a, and 3b, the two magnets 2a and 2b, and the two holding magnets 7a and 7b are provided as illustrated in FIG. 2, the relationship can be presented in the spring model of FIG. 4.

As illustrated in S1 of FIG. 3, when the first and second coils 3a and 3b are not energized, only the holding force caused by the holding magnet 7 acts on the output shaft 5. The spring constants of the first and second spring portions 12a and 12b at this point in time are assumed to be 1.0 K. When current in a clockwise direction flows through the first and second coils 3a and 3b as illustrated in S2, forces that push from both sides are exerted on the output shaft 5 by the first and second coils 3a and 3b. Hence, the spring constants of the first and second spring portions 12a and 12b are increased from 1.0 K to 1.2 K. When the current in the clockwise direction flowing through the first and second coils 3a and 3b reaches a maximum as illustrated in S3, the spring constants of the first and second spring portions 12a and 12b also reach a maximum of 1.4 K. When the current in the clockwise direction flowing through the first and second coils 3a and 3b decreases to the same magnitude as S2 as illustrated in S4, the spring constants of the first and second spring portions 12a and 12b also decrease to the same magnitude as S2. When the current in the clockwise direction flowing through the first and second coils 3a and 3b becomes zero, that is, is not energized, as illustrated in S5, the spring constants of the first and second spring portions 12a and 12b become 1.0 K that is only the holding force caused by the holding magnet 7. The spring constants at this point in time are the same magnitude as S1.

Next, when the direction of the current flowing through the first and second coils 3a and 3b is switched and current in a counterclockwise direction flows through the first and second coils 3a and 3b as illustrated in S6, forces that pull from both sides act on the output shaft 5. Hence, the force of the holding magnet 7 to hold the output shaft 5 is weakened. The spring constants of the first and second spring portions 12a and 12b further decrease than S5, and are reduced to 0.8 K. When the current in the counterclockwise direction flowing through the first and second coils 3a and 3b reaches a maximum as illustrated in S7, the spring constants of the first and second spring portions 12a and 12b reach a minimum of 0.6 K. When the current in the counterclockwise direction flowing through the first and second spring coils 3a and 3b increases to the same magnitude as S6 as illustrated in S8, the spring constants of the first and second spring portions 12a and 12b also increase to 0.8 K that is the same as S6. It enters the same non-energized state as S1 afterward. The cycle of S1 to S8 is repeated from then on. As described above, when the alternating current is caused to flow through the first and second coils 3a and 3b, the spring constants of the first and second spring portions 12a and 12b change cyclically.

In this example, the forces that pull the output shaft 5 toward the left and the right caused by the first and second coils 3a and 3b are equal to or less than the force of the holding magnet 7 to hold the output shaft 5. The forces that push from the left and the right always act on the output shaft 5. However, it is also possible to make the forces that pull the output shaft 5 caused by the first and second coils 3a and 3b equal to or more than the force of the holding magnet 7 to hold the output shaft 5, and to exert the forces to pull from the left and the right on the output shaft 5.

Figure 5:
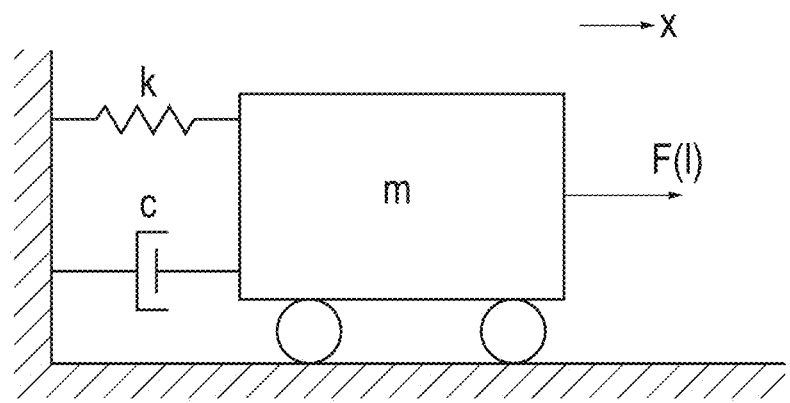
FIG. 5 is a diagram illustrating a typical spring-mass system.

In a spring-mass system illustrated in FIG. 5, the natural frequency $\omega$ (rad/sec) can be expressed as $\omega=\sqrt{(k/m)}$ where k is the spring constant and m is mass. It can be seen from this mathematical equation that when k or m changes, the natural frequency $\omega$ changes. In the sound reduction or vibration damping apparatus 1 of the embodiment, the spring constant k changes cyclically. Accordingly, the natural frequency $\omega$ changes cyclically.

Figure 6:
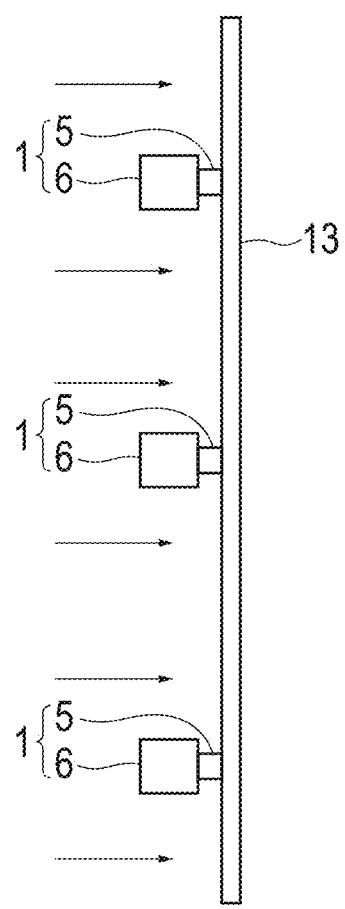
FIG. 6 is a diagram illustrating an example where the sound reduction or vibration damping apparatus of the first embodiment of the present invention is mounted on a soundproof wall.

FIG. 6 illustrates an example where the sound reduction or vibration damping apparatus 1 of the embodiment is mounted on a soundproof wall as the structural member 13. In this example, the output shaft 5 is attached to the structural member 13. The armature portion 6 becomes the mass portion 11. When the sound reduction or vibration damping apparatus 1 of the embodiment is attached, the resonant frequency of the structural member 13 fluctuates. Accordingly, noise passing through the structural member 13 can be reduced.

The structural member 13 has a resonant frequency. The structural member 13 can reduce noise at frequencies away from the resonant frequency. However, the structural member 13 likely transmits noise near the resonant frequency. This is because resonance occurs in the structural member 13 due to the noise near the resonant frequency. However, when the sound reduction or vibration damping apparatus 1 whose natural frequency continues changing is mounted on the structural member 13, the resonant frequency of the structural member 13 fluctuates from the fixed value (for example, fluctuates to 100 Hz, 110 Hz, 120 Hz, 110 Hz, 100 Hz . . . ). In this manner, the resonant frequency of the structural member 13 is fluctuated from the fixed value. Accordingly, the resonant frequency of the structural member 13 matches the frequency of a sound at an instant to make it easy for the sound to pass through the structural member. However, the resonant frequency of the structural member 13 becomes different from the frequency of the sound to make it difficult for the sound to pass through the structural member 13 at the next instant. Therefore, sounds near the resonant frequency that pass through the structural member 13 can be reduced.

The sound reduction or vibration damping apparatus 1 of the embodiment further exerts the following effect: The spring constant of the sound reduction or vibration damping apparatus 1 can be caused to change cyclically. Accordingly, it is possible to stably reduce sound passing through the structural member 13 or sound generated from the structural member 13, and stably damp the vibration of the structural member 13.

The first and second spring portions 12a and 12b push and/or pull the mass portion 11 simultaneously in opposite directions. Accordingly, it is possible to change the spring constants of the first and second spring portions 12a and 12b, and by extension to change the natural frequency of the sound reduction or vibration damping apparatus 1.

The first and second spring portions 12a and 12b include the first and second coils 3a and 3b that exert the repulsive and/or attractive forces on the magnet 2. The control unit 4 causes alternating current to flow through the first and second coils 3a and 3b. Accordingly, it becomes easy to cause the spring constants of the first and second spring portions 12a and 12b to continue changing cyclically.

Figure 7:
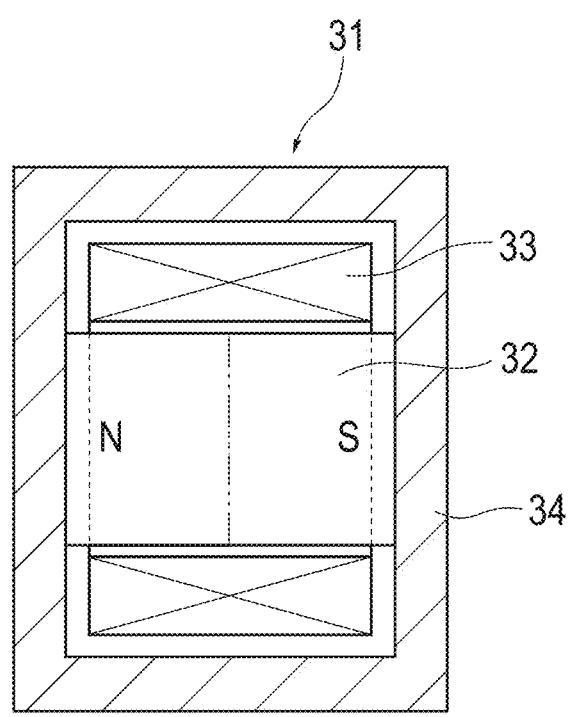
FIG. 7 is a schematic diagram of a sound reduction or vibration damping apparatus of a second embodiment of the present invention.

FIG. 7 illustrates a sound reduction or vibration damping apparatus 31 of a second embodiment of the present invention. The sound reduction or vibration damping apparatus 31 of the second embodiment is different from the sound reduction or vibration damping apparatus 1 of the first embodiment in the point that the magnetic spring includes one magnet 32 and one coil 33. The magnet 32 magnetized in the direction of its axis is fixed in a box-shaped case 34. An armature portion including the coil 33 that surrounds the magnet 32 is accommodated in the case 34. When a control unit causes alternating current to flow through the coil 33, the armature portion reciprocates in the direction of the axis of the magnet 32. The reciprocating motion of the armature portion equal to or more than a predetermined amount is restricted by the case 34. When current flowing through the coil 33 is changed under restriction of the movement of the armature portion, the spring constant of the magnetic spring changes. The case 34 is fixed to the structural member 13.

The correspondence between the sound reduction or vibration damping apparatus 31 of the second embodiment of the present invention and the model of FIG. 1 is as follows: The armature portion including the coil 33 of FIG. 7 corresponds to the mass portion 23 of FIG. 1. The magnetic spring including the magnet 32 and the coil 33 of FIG. 7 corresponds to the spring portion 24 with the variable spring constant of FIG. 1. The friction caused when the armature portion moves relatively to the magnet 32 of FIG. 7 corresponds to the damping force of the damper portion 27 of FIG. 1.

Figure 8:
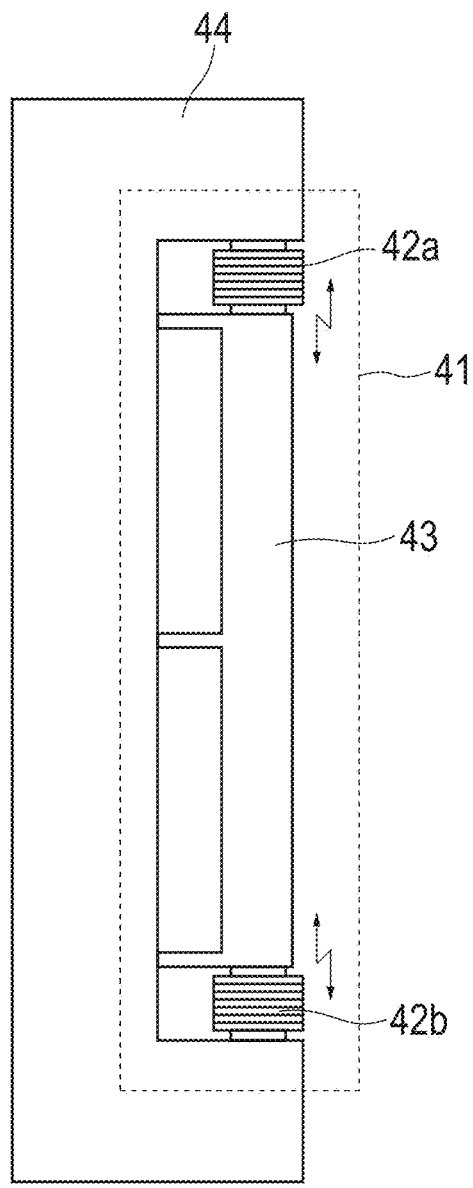
FIG. 8 is a schematic diagram of a sound reduction or vibration damping apparatus of a third embodiment of the present invention.

FIG. 8 illustrates a sound reduction or vibration damping apparatus 41 of a third embodiment of the present invention. The sound reduction or vibration damping apparatus 41 of the third embodiment is different from the sound reduction or vibration damping apparatus 1 of the first embodiment in the point that the first and second spring portions include first and second magnetostrictive elements or piezoelectric elements (hereinafter referred to as the first and second actuators 42a and 42b) placed in such a manner as to sandwich a wall portion 43 as the mass portion. The sound reduction or vibration damping apparatus 41 is mounted in a structural member 44. The structural member 44 and the wall portion 43 constitute a wall module such as a wall of a warehouse.

Figure 9A:
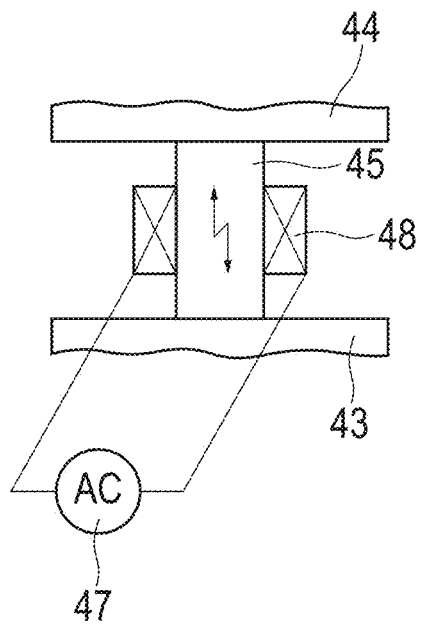
FIG. 9(a) is a side view of a magnetostrictive element.
Figure 9B:
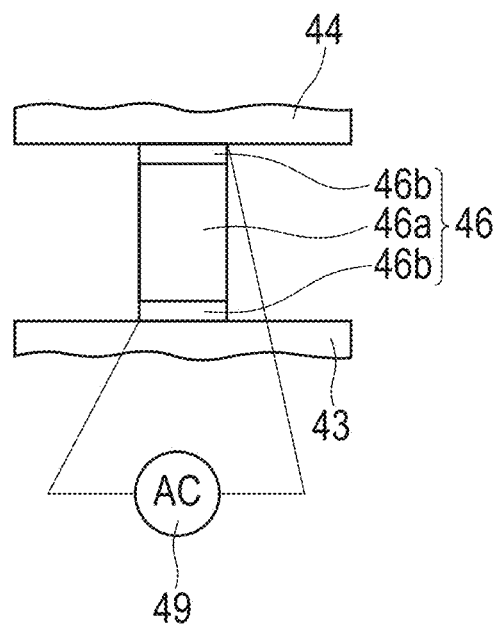
FIG. 9(b) is a side view of a piezoelectric element.

The first and second actuators 42a and 42b each include a magnetostrictive element 45 illustrated in FIG. 9(a), or a piezoelectric element 46 illustrated in FIG. 9(b). As illustrated in FIG. 9(a), the magnetostrictive element 45 is publicly known which deforms elastically due to the influence of an external magnetic field. A control unit 47 controls current to be supplied to a coil 48 in such a manner as to change the external magnetic field. As illustrated in FIG. 9(b), the piezoelectric element 46 is publicly known which is formed by sandwiching a piezoelectric material 46a between two electrodes 46b, and is elastically deformed by a voltage applied to the piezoelectric material 46a. The control unit 49 controls the voltage to be applied to the piezoelectric material 46a.

When it is configured as illustrated in FIG. 8 such that the wall portion 43 as the mass portion is sandwiched between the first and second actuators 42a and 42b to push and/or pull the wall portion 43 simultaneously in opposite directions, the stiffness of the sound reduction or vibration damping apparatus 41 changes to change the spring constants of the first and second actuators 42a and 42b. If the sound reduction or vibration damping apparatus 41 where the spring constant continues changing is mounted in the structural member 44, the resonant frequency of the structural member 44 fluctuates.

The correspondence between the sound reduction or vibration damping apparatus 41 of the third embodiment of the present invention and the model of FIG. 1 is as follows: The wall portion 43 of FIG. 8 corresponds to the mass portion 23 of FIG. 1. The first and second actuators 42a and 42b of FIG. 8 correspond to the spring portion 24 with the variable spring constant of FIG. 1.

The sound reduction or vibration damping apparatus 41 of the third embodiment exerts the following effect: The spring constants of the first and second spring portions can be increased with the use of the first and second actuators 42a and 42b as the first and second spring portions. Hence, it becomes possible to reduce the sound of, or to damp the vibration of the structural member 44 with high stiffness.

Figure 10:
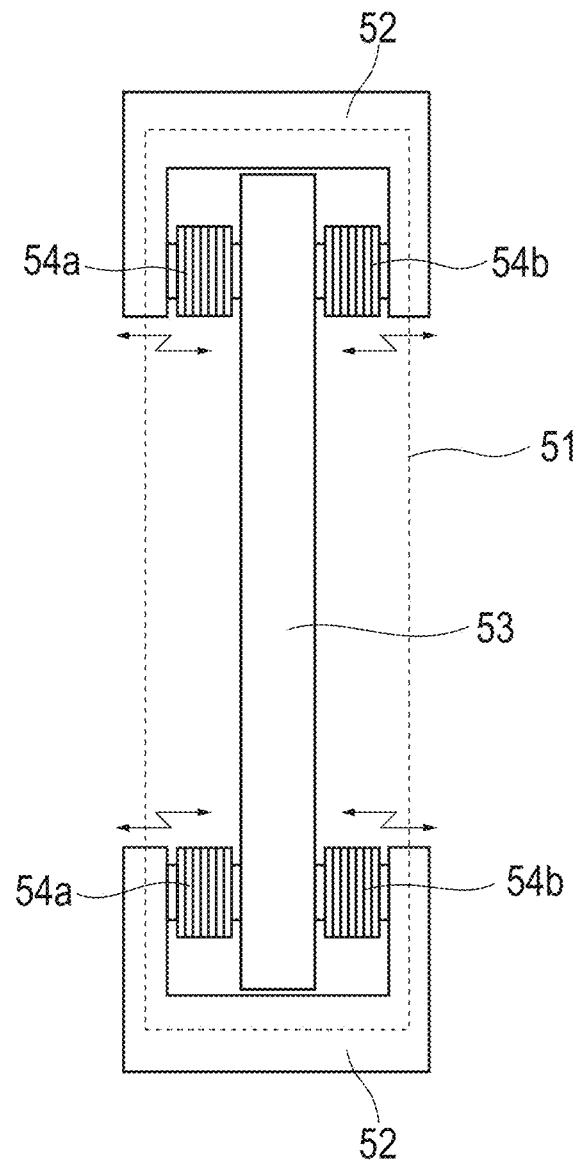
FIG. 10 is a schematic diagram of a sound reduction or vibration damping apparatus of a fourth embodiment of the present invention.

FIG. 10 illustrates a sound reduction or vibration damping apparatus 51 of a fourth embodiment of the present invention. In the fourth embodiment, the sound reduction or vibration damping apparatus 51 is mounted on a wall support portion 52 as the structural member. The sound reduction or vibration damping apparatus 51 includes a wall portion 53 as the mass portion, and first and second actuators 54a and 54b placed in such a manner as to sandwich the wall portion 53. The first and second actuators 54a and 54b are placed at upper and lower ends of the wall portion 53. Four first and second actuators 54a and 54b in total are illustrated. When the sound reduction or vibration damping apparatus 51 where the spring constants continue changing is mounted on the wall support portion 52, the resonant frequency of the wall support portion 52 fluctuates.

Figure 11:
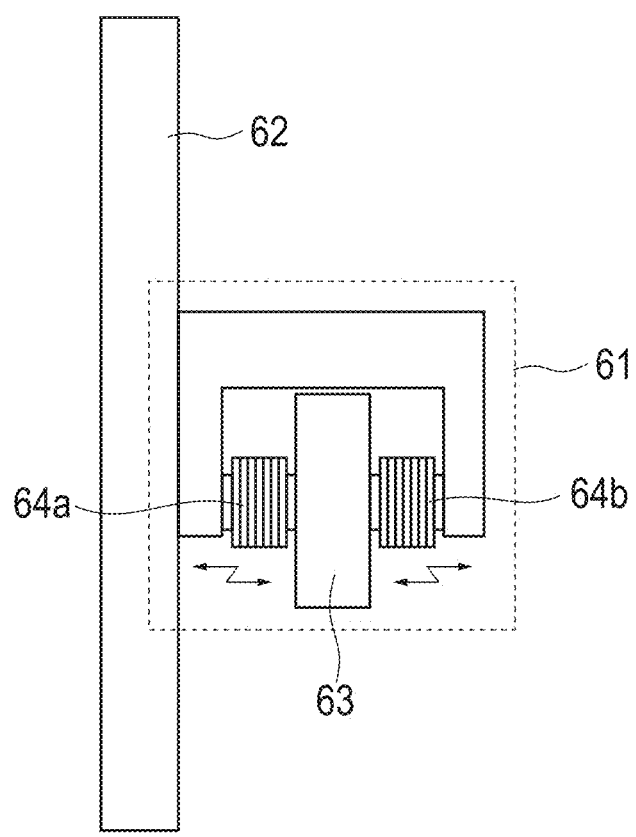
FIG. 11 is a schematic diagram of a sound reduction or vibration damping apparatus of a fifth embodiment of the present invention.

FIG. 11 illustrates a sound reduction or vibration damping apparatus 61 of a fifth embodiment of the present invention. In the fifth embodiment, the sound reduction or vibration damping apparatus 61 is mounted on a wall portion 62 as the structural member. The sound reduction or vibration damping apparatus 61 includes a mass portion 63, and first and second actuators 64a and 64b placed in such a manner as to sandwich the mass portion 63. When the sound reduction or vibration damping apparatus 61 where the spring constants change is mounted on the wall portion 62, the resonant frequency of the wall portion 62 fluctuates.

First Example

Figure 12:
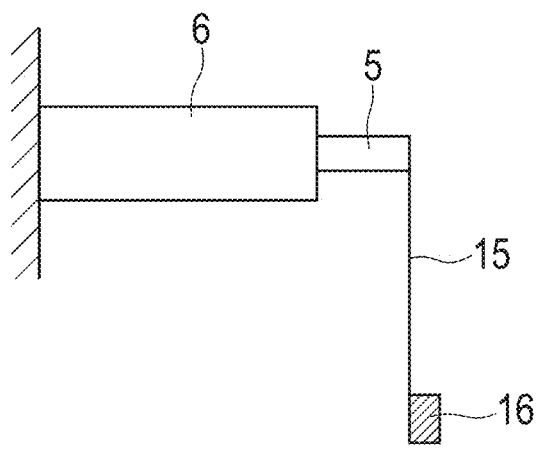
FIG. 12 is a schematic diagram of an effect check experiment of the sound reduction or vibration damping apparatus of the embodiment.

An experiment was conducted to check the damping effect of the sound reduction or vibration damping apparatus 1 of the embodiment. As illustrated in FIG. 12, the armature portion 6 of the sound reduction or vibration damping apparatus 1 was fixed. A flat spring 15 made of a thin steel sheet was attached to a distal end of the output shaft 5. A weight 16 was attached to a lower end of the flat spring 15. The portion of the weight 16 was tapped with a hammer to vibrate the weight 16 freely. The free vibration of the weight 16 was measured with a laser length measuring device.

Figure 13:
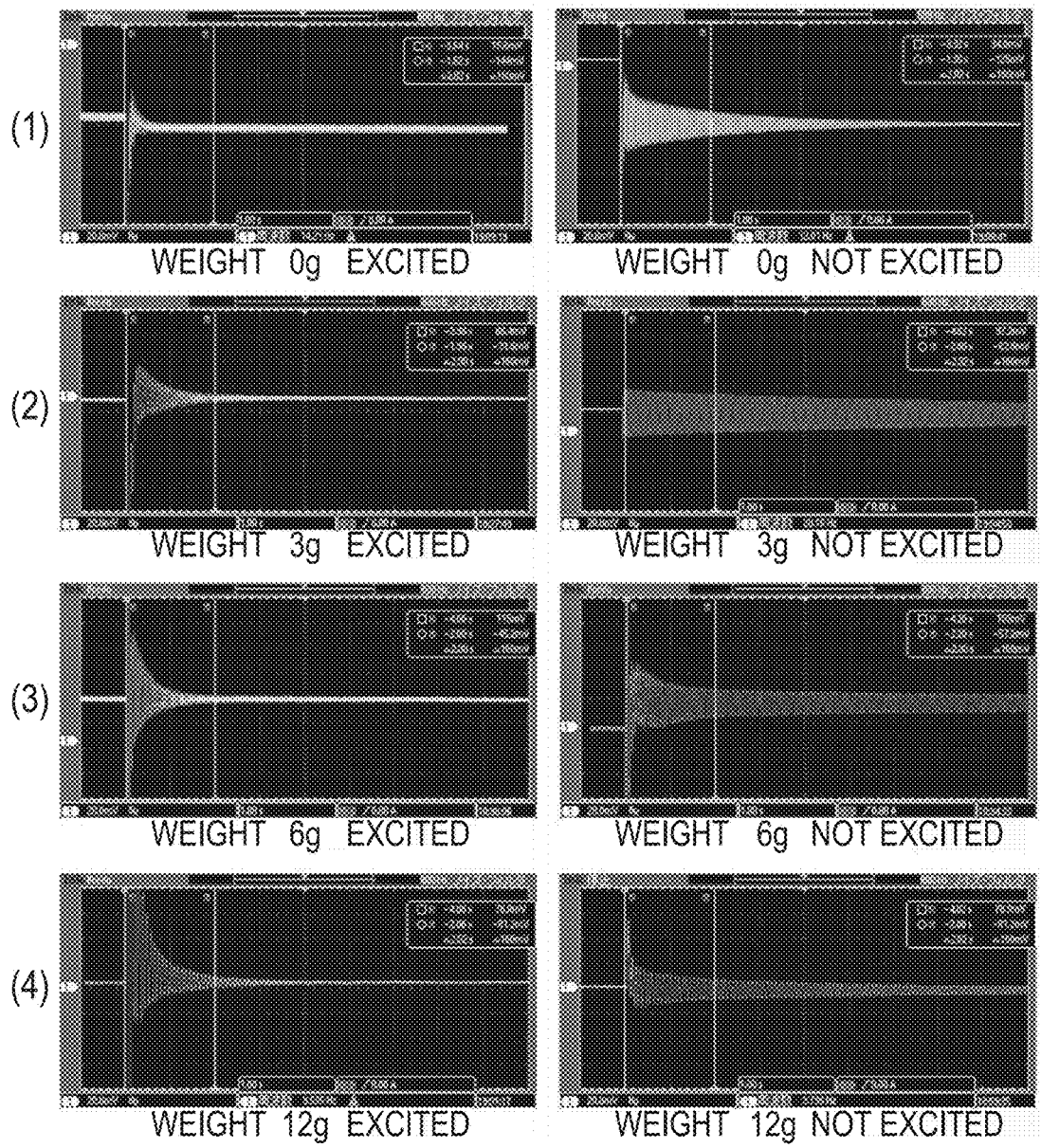
FIGS. 13(1) to 13(4) are graphs illustrating experiment results.

FIGS. 13(1) to 13(4) illustrate measurement results of the vibration of the weight 16. FIG. 13(1) illustrates a case of a weight of 0 g. FIG. 13(2) illustrates a case of a weight of 3 g. FIG. 13(3) illustrates a case of a weight of 6 g. FIG. 13(4) illustrates a case of a weight of 12 g. The right column in the figure indicates a case where alternating current was not supplied to the first and second coils 3a and 3b. The left column in the figure illustrates a case where alternating current was supplied to the first and second coils 3a and 3b. When the weight was tapped with the hammer, the weight vibrates freely at its resonant frequency, and the free vibration of the weight takes time to be damped as illustrated in the right column in the figure. In contrast, the first and second coils 3a and 3b were excited and accordingly, vibration was damped immediately in all the weight cases of the weight 16 as illustrated in the left column in the figure. The reason is assumed that the spring constant of the sound reduction or vibration damping apparatus 1 changed cyclically, and the resonant frequency of the flat spring-weight system fluctuated.

The present invention is not limited to the concretization of the embodiments, and can be concretized into another embodiment within the scope that does not change the gist of the present invention.

For example, the numbers and shapes of coils and holding magnets of the armature portion, and magnets are not limited to those of the first embodiment.

In the first embodiment, the spring constants of the first and second springs 12a and 12b are caused to change cyclically. However, the spring constants of the first and second springs 12a and 12b can also be changed like a wave where cycle and/or amplitude are changed arbitrarily (randomly), or like a wave where the relationship between frequency and amplitude is the relationship of 1/f fluctuation.

In the first embodiment, the holding magnet is used to hold the output shaft at the origin point. However, a coil spring or the like may be used instead of the holding magnet.

In the first embodiment, the first and second coils apply a repulsive force and an attractive force to the magnet. However, the first and second coils can also apply only one of a repulsive force and an attractive force to the magnet.

In the first embodiment, the magnetic spring including the coils and the magnets is used as the first and second spring portions. However, a pair of piezoelectric elements or magnetostrictive elements that sandwiches the mass portion from both sides can also be used instead of the magnetic spring as in the third to fifth embodiments.

In the first to fifth embodiments, the spring constant of the spring portion is caused to continue changing. However, it is also possible to continue changing the damping constant of the damper in addition to the spring constant of the spring portion. For example, an orifice of the damper is narrowed or widened and accordingly, the damping constant of the damper can be caused to continue changing.

In the third to fifth embodiments, two or more actuators are provided. However, the number of actuators can be set to one if the actuator is precompressed.

INDUSTRIAL APPLICABILITY

A sound reduction or vibration damping apparatus of the present invention can be used for a soundproof wall and also be used to reduce noise generated from structural members of various devices such as an air-conditioner, a printer, and a multi-function peripheral. Moreover, noise is a kind of vibration. Therefore, the sound reduction or vibration damping apparatus of the present invention can also be used to damp the vibration of structural members of various devices such as a manufacturing apparatus and a testing apparatus, and to damp the vibration of structural members of vehicles such as an automobile.

REFERENCE SIGNS LIST 1, 31, 41, 51, 61 . . . sound reduction or vibration damping apparatus, 2a, 2b . . . first and second magnets (magnet), 3a, 3b . . . first and second coils (coil), 4, 25 . . . control unit, 5 . . . output shaft, 6 . . . armature portion, 11, 23, 43, 53, 63 . . . mass portion, 12a, 12b . . . first and second spring portions (spring portion), 13 . . . structural member, 24 . . . spring portion, 42a, 42b . . . first and second actuators (first and second spring portions, spring portion), 54a, 54b . . . first and second actuators (first and second spring portions, spring portion), 64a, 64b . . . first and second actuators (first and second spring portions, spring portion)

The invention claimed is:

1. A sound reduction or vibration damping apparatus comprising:
   a mass portion;
   a spring portion placed between the mass portion and a structural member; and
   a control unit configured to cause a spring constant of the spring portion to continue changing, without the changing of the spring constant being based on a vibration of the structural member.

2. The sound reduction or vibration damping apparatus according to claim 1, wherein the control unit causes the spring constant of the spring portion to continue changing cyclically.

3. The sound reduction or vibration damping apparatus according to claim 1,
   wherein the spring portion includes a first and a second spring portion configured to exert force on the mass portion, and
   the control unit controls the first and the second spring portion to push and/or pull the mass portion simultaneously in opposite directions.

4. The sound reduction or vibration damping apparatus according to claim 1,
   wherein the spring portion includes a coil exerting a repulsive and/or an attractive force on a magnet, and
   the control unit causes alternating current to flow through the coil.

5. The sound reduction or vibration damping apparatus according to claim 1, wherein the spring portion includes a piezoelectric element or magnetostrictive element.

6. The structural member on which the sound reduction or vibration damping apparatus according to claim 1 is mounted.

7. The sound reduction or vibration damping apparatus according to claim 2,
   wherein the spring portion includes a first and a second spring portion configured to exert force on the mass portion, and
   the control unit controls the first and the second spring portion to push and/or pull the mass portion simultaneously in opposite directions.

8. The sound reduction or vibration damping apparatus according to claim 2,
   wherein the spring portion includes a coil exerting a repulsive and/or an attractive force on a magnet, and
   the control unit causes alternating current to flow through the coil.

9. The sound reduction or vibration damping apparatus according to claim 3,
   wherein the spring portion includes a coil exerting a repulsive and/or an attractive force on a magnet, and
   the control unit causes alternating current to flow through the coil.

10. The sound reduction or vibration damping apparatus according to claim 2, wherein the spring portion includes a piezoelectric element or magnetostrictive element.

11. The sound reduction or vibration damping apparatus according to claim 3, wherein the spring portion includes a piezoelectric element or magnetostrictive element.

12. The structural member on which the sound reduction or vibration damping apparatus according to claim 2 is mounted.

13. The structural member on which the sound reduction or vibration damping apparatus according to claim 3 is mounted.

14. The structural member on which the sound reduction or vibration damping apparatus according to claim 4 is mounted.

15. The structural member on which the sound reduction or vibration damping apparatus according to claim 5 is mounted.

16. The sound reduction or vibration damping apparatus according to claim 7,
   wherein the spring portion includes a coil exerting a repulsive and/or an attractive force on a magnet, and
   the control unit causes alternating current to flow through the coil.

17. The sound reduction or vibration damping apparatus according to claim 7, wherein the spring portion includes a piezoelectric element or magnetostrictive element.

18. The structural member on which the sound reduction or vibration damping apparatus according to claim 7 is mounted.

19. The structural member on which the sound reduction or vibration damping apparatus according to claim 8 is mounted.

* * * * *